W. WESTBURY.
GLASS DRAWING APPARATUS.
APPLICATION FILED SEPT. 8, 1915.
1,276,465.
Patented Aug. 20, 1918.
2 SHEETS—SHEET 1.
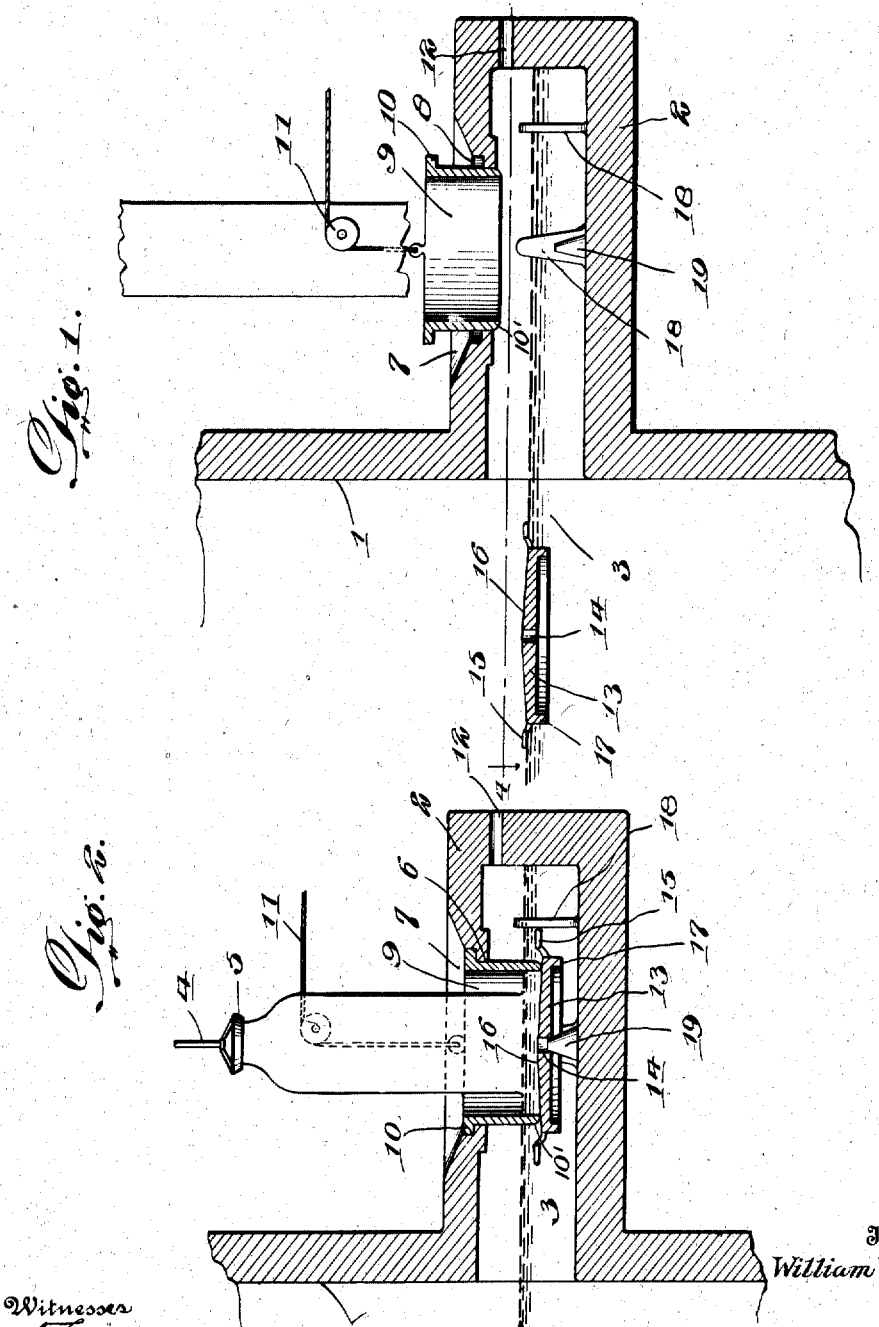
Witnesses
Frederich L. Fox.
C. C. Hines
Inventor
William Westbury
By Victor J. Evans.
Attorney

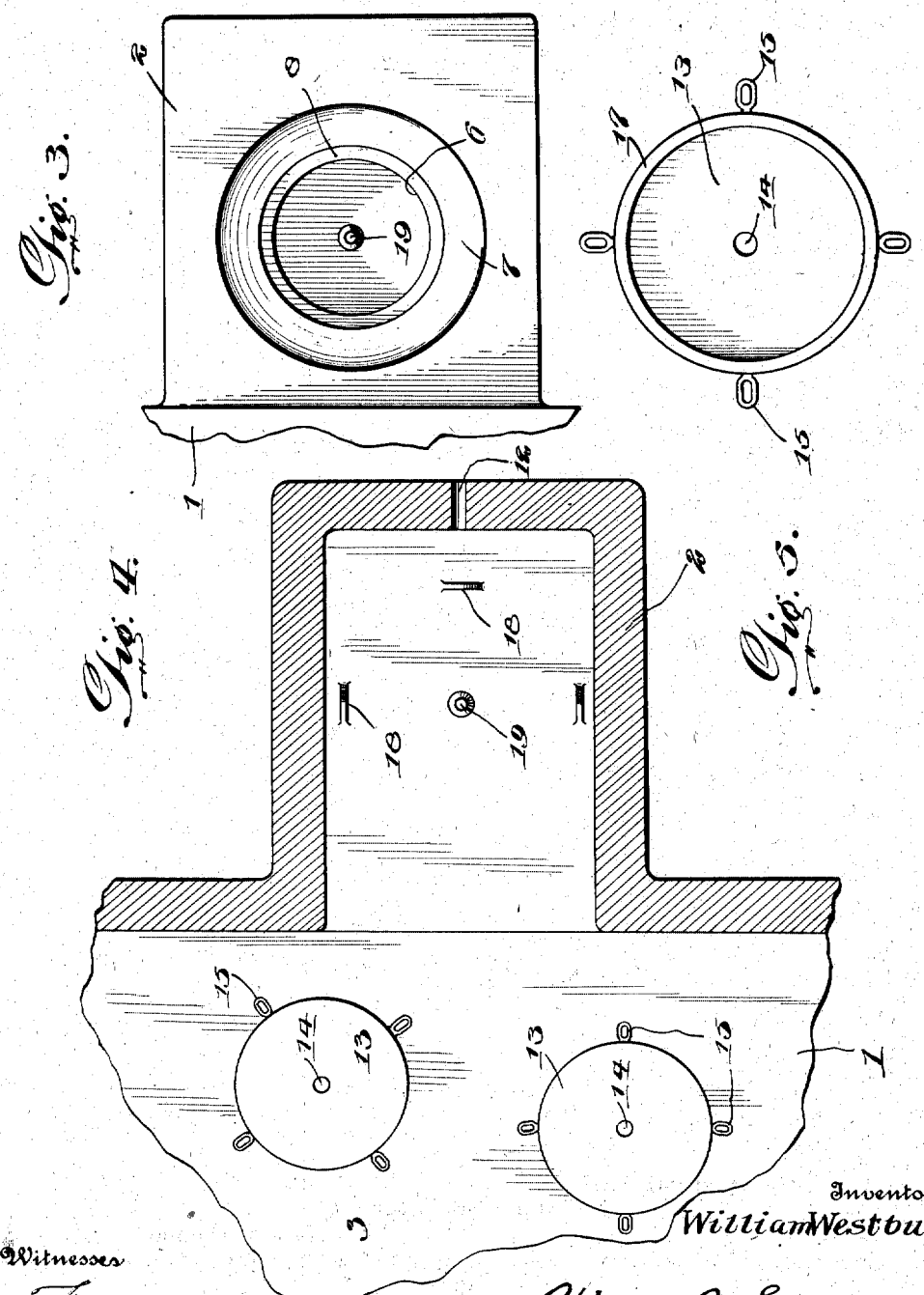

UNITED STATES PATENT OFFICE.

WILLIAM WESTBURY, OF OKMULGEE, OKLAHOMA, ASSIGNOR TO L. S. SKELTON, OF OKMULGEE, OKLAHOMA.

GLASS-DRAWING APPARATUS.

1,276,465.  Specification of Letters Patent.  Patented Aug. 20, 1918.

Application filed September 8, 1915. Serial No. 49,536.

*To all whom it may concern:*

Be it known that I, WILLIAM WESTBURY, a citizen of the United States, residing at Okmulgee, in the county of Okmulgee and State of Oklahoma, have invented new and useful Improvements in Glass-Drawing Apparatus, of which the following is a specification.

This invention relates to improvements in apparatus for drawing glass into cylinders for use in the production of window glass, etc., and particularly to means for insuring the supply of glass of substantially even temperature and free from defects to the drawing tool and reducing the amount of impurities upon the surface of the molten body of glass in the dog house, whereby the necessity of constantly raking or skimming off impurities is avoided and greater economy of operation and uniformity of excellence in the drawing of perfect cylinders secured.

The primary object of the invention is to provide simple, reliable and efficient means for obtaining the desired result, said means embodying devices for supplying glass free from impurities for the drawing action and excluding the impure glass from the drawing zone, such means also serving to admit of the removal of the aftermath from the drawing zone after each drawing operation and its reduction to a molten state, to keep the surface of the glass as free from impurities as possible at all times.

A further object of the invention is to provide devices of the character described and for performing the desired feed controlling and purifying actions, and which govern the supply of glass to expose to the drawing tool a restricted body of glass which is of proper temperature and substantially free from all defects liable to result in an imperfect draw or to cause other troubles or difficulties in the operation of the apparatus.

The invention consists of the features of construction, combination and arrangement of parts herein fully described and claimed, reference being had to the accompanying drawings in which:—

Figure 1 is a vertical section through the dog house and a portion of the furnace chamber of a glass drawing apparatus embodying my invention, showing the well tube elevated and the parts in the relative positions as between drawing actions.

Fig. 2 is a view similar to Fig. 1 showing the parts as they appear at the beginning of a drawing action.

Fig. 3 is a fragmentary top plan view of the dog house.

Fig. 4 is a sectional plan view on the line 4—4 of Fig. 1.

Fig. 5 is a bottom plan view of one of the feed controlling disks.

Referring to the drawings, 1 designates the furnace chamber, and 2 the dog house or well of a glass drawing apparatus, which contains the body of molten glass 3 from which the cylinders are to be formed through the medium of the usual drawing mechanism, including the drawing tool 4 provided with the usual bait 5. The drawing mechanism employed may be any of those in common use, a specific description thereof being unnecessary, as the same constitutes no part of the present invention.

As shown, the dog house 2 is provided in its top with an opening 6 surrounded by a concavity or sloping surface 7 intersecting at its base an annular groove or recess 8. This opening 6 receives a vertically sliding or adjustable well tube 9 provided at its upper edge with a rim flange 10 to seat within said groove or recess and support the tube in position when fully depressed, as shown in Fig. 2. The lower end of the well tube is beveled as seen at 10′, said bevel coacting with the sloping top surface 7 to guide the well tube, when lowered, to the opening 6. The tube is adapted to be raised and lowered by suitable hoisting mechanism 11 of any preferred type and is of such a depth that when fully depressed its lower edge will extend just sufficiently below the surface of the molten glass to admit and receive into said tube a proper quantity of glass to form the cylinder. The dog house is formed at its outer side or end remote from the furnace chamber with an opening 12 for the insertion of a manipulating tool, as hereinafter described, and also for the insertion and removal of a rake or skimmer at such intervals as the use of such a device is necessary.

The purpose of the well tube 9 is to enable a restricted amount of glass free from impurities to be presented to the drawing tool for each drawing action, which glass is segregated from the body of glass within the well and is kept free from any impurities which may float upon the surface of the body of glass. The tube is depressed for coöperation with an underlying closure pot or disk for the drawing action and thereafter raised to the position shown in Fig. 1 to enable such closure disk with the aftermath to be removed and another closure disk free from crusts or impurities to be brought into position for use, whereupon the well tube is again depressed for action. The purpose of the concavity or sloping surface 7 is to permit air to come in contact with as much of the entire surface of the well tube as possible, when the latter is elevated, to keep the same at a substantially uniform temperature.

In practice, any suitable number of the closure disks or pots referred to may be employed, and these disks or pots 13 are made, like the well tube, of fire clay or other suitable material and are adapted to normally rest upon the surface of the liquid glass. Each disk is of circular form and of somewhat greater diameter than the well tube, so that when a disk is in proper coöperative position beneath the tube it will close the bottom thereof against communication with the dog house except through a restricted feed opening 14 provided at the center of the disk. The disk is furnished at suitable points around its periphery with laterally projecting loops or eyes 15 adapted to be engaged by a manipulating tool inserted through the opening 12 so that a disk may be drawn from the furnace chamber into the dog house beneath the well tube for coöperation therewith, and afterward forced backward out of the dog house into the furnace chamber.

When a disk is brought into position beneath the well tube and the latter is depressed preliminarily to the drawing action, the disk is depressed below the surface of the glass and glass is permitted to enter the tube only through the restricted opening 14, whereby a supply of glass for the drawing action is furnished. The cylinder is then drawn in the usual way and detached from the bait and any portion of glass remaining in the well tube. This portion of glass, commonly called the aftermath, usually floats upon the surface of the body of glass and is raked back into the furnace chamber at intervals for its reduction to a liquid state, more or less of such impurities remaining at all times with well known disadvantages. In the case of the present invention, however, this aftermath remains upon the disk and as soon as the draw is completed the well tube 9 is elevated to allow the disk to come to the surface of the molten glass and the manipulating implement is employed to force such disk back into the furnace chamber so that the aftermath will be heated and again reduced to a liquid condition, and another or clean disk free from impurities is brought into position for coöperation with the well tube in the ensuing drawing action.

For the purpose of facilitating the cleansing of each disk the upper surface of the disk, as shown at 16, is preferably convexed or made to slope from its center to its periphery, allowing the melted glass to flow off to the surface of the body of glass in the furnace chamber. For the purpose of further insuring the supply of pure glass to the well tube, I provide each disk with a depending ring-shaped flange 17 forming a dam or chamber beneath the disk of proper area to hold and retain a sufficient amount of pure liquid glass for a draw. It will thus be understood that a clean disk within the furnace chamber confining beneath it a body of pure liquid glass may be drawn into the dog house beneath the well tube for use, the supply of liquid glass carried thereby being in this manner segregated from all impurities in the dog house and brought into position to be forced upward through the opening 14 into the well when the well and disk are depressed for the drawing operation.

The bottom of the dog house is provided with stops or centering abutments 18 to bear upon three sides of the disk and insure its proper position with respect to the well tube when arranged for coöperation therewith, and upon the bottom of the dog house is also provided a projection 19 preferably of tapered form and serving as a plug or stopper to close the opening 14 when the disk is depressed or submerged to just the proper extent, preventing an excess supply of glass to the well tube and excluding from the segregated charge of glass within the feed chamber upon the under side of the disk any impurities from the glass within the dog house.

In the operation of the apparatus any particles of glass which may chill or harden in the well tube may be liquefied and removed when the tube is depressed by the use of burners or other suitable means to heat said tube, thus providing for the removal of all crusts or impurities from the only part of the apparatus liable to be troubled therewith. It will be evident, of course, that in the practical employment of the invention any number of the closure disks may be used so that while one is in service the remainder may be disposed within the furnace chamber where the heat will liquefy all solid glass and maintain all of the reserve disks in condition for successive use. Hence as the aftermath is taken care of and glass free from impurities only furnished for the draw, cylinders of uniform excellence may be drawn, while by reducing the amount of scum or impurities necessary to be raked at intervals from the dog house into the furnace chamber time and labor are saved with a resulting increase of efficiency of the apparatus and economy of operation thereof.

It is to be understood that the construction disclosed herein and defined in the appended claims may be embodied in a pot which is complete in itself, and provided with either a top or a bottom chamber, or which is specifically in the form of a disk which is adapted for coöperation with a complementary pot forming member, such as the tube 9 shown in the present instance.

I claim:—

1. A glass drawing apparatus including a liquid glass reservoir having an opening in the top thereof, said opening surrounded by an annular seat, and said top being sloped in the direction of the opening, and a well tube suspended above the top of the reservoir and adapted to be lowered through the opening, said well tube having a beveled lower end co-acting with the sloping top to guide said well tube to the opening.

2. A glass drawing apparatus including a liquid glass reservoir having an opening in the top thereof, said opening surrounded by an annular seat, and said top being sloped in the direction of the opening, and a well tube suspended above the top of the reservoir and adapted to be lowered through the opening, said well tube having a beveled lower end co-acting with the sloping top to guide said well tube to the opening, and said well tube having an annular flange to engage the annular seat surrounding the opening.

3. In a glass drawing apparatus, a liquid glass reservoir having an opening in the top thereof, a well tube adapted to be lowered through said opening in the direction of the molten glass, and a floating closure element adapted to be moved into registry with the lower end of the well tube and to be depressed by engagement with the well tube below the surface of the molten glass, said closure element having a peripheral depending flange constituting a dam for segregating a portion of the molten glass and said closure element having also a centrally disposed feed opening of relatively small size to permit the passage of the molten glass segregated by the dam in an upward direction within the well tube; in combination with means fixed in the glass reservoir for centering the closure element with respect to the well tube and a conical stopper element rising from the bottom of the glass reservoir to close the feed aperture when the closure element has been depressed to a predetermined extent.

4. In a glass drawing apparatus, a liquid glass reservoir having an opening in the top thereof, a conical stopper element rising from the bottom thereof centrally with respect to the opening, a well tube adjustable through the opening in the direction of the molten glass and a closure element floating on the surface of the molten glass for coöperation with the well tube, said closure element having a depending peripheral flange constituting a dam for segregating a portion of the molten glass and said closure element having also a central opening for coöperation with the stopper element.

5. A glass drawing apparatus including a liquid glass reservoir having an opening in the top thereof, a concavity provided with sloping walls extending to said opening, and a groove or recess around the margin of the opening, a well tube vertically adjustable in said opening and having a flanged seat within said groove when the tube is depressed, and a closure disk adapted to float upon the surface of the glass and to be moved into and out of registration with said well tube and having a restricted feed opening therein.

In testimony whereof I affix my signature in presence of two witnesses.

WILLIAM WESTBURY.

Witnesses:
 E. HUME TALBERT,
 BENNETT S. JONES.

Copies of this patent may be obtained for five cents each, by addressing the "Commissioner of Patents, Washington, D. C."